United States Patent

[11] 3,621,145

[72] Inventor Willi Verstegen
Kornwestheim, Germany
[21] Appl. No. 855,612
[22] Filed Sept. 5, 1969
[45] Patented Nov. 16, 1971
[73] Assignee International Standard Electric Corporation
New York, N.Y.
[32] Priority Sept. 19, 1968
[33] Germany
[31] P 17 62 896.5

[54] TELEPHONE SWITCHING TRANSLATOR
2 Claims, 2 Drawing Figs.

[52] U.S. Cl. ..... 179/18 ET
[51] Int. Cl. ..... H04q 3/47
[50] Field of Search ..... 179/18 ET, 18 D, 27 DA

[56] References Cited

UNITED STATES PATENTS 3,235,664 2/1966 Muroga et al. ..... 179/18 ET

FOREIGN PATENTS 837,931 6/1960 Great Britain ..... 179/18 ET

*Primary Examiner*—Kathleen H. Claffy
*Assistant Examiner*—Thomas W. Brown
*Attorneys*—C. Cornell Remsen, Jr., Walter J. Baum, Marvin M. Chaban, Percy P. Lantzy, J. Warren Whitesel, Delbert P. Warner and James B. Raden

ABSTRACT: Gate circuits are allocated to the evaluating circuits in the evaluating translator unit. These gate circuits are provided with current via low-resistance secondary paths before evaluation. The gates circuits are connected to the outputs of a counting chain adapted to block the low-resistance secondary paths of the gate circuits, individually in succession, for the purposes of evaluation. The interrogation of the translator outputs involves no significant new building up processes, since only one translator output loads the corresponding row resistor at a time. Further gate circuits are assigned to the evaluating circuits. The pulse responsible for indexing the counting chain is fed, via a time-lag component, to these gate circuits. This measure ensures that no invalid output information is indicated during the short period before the occurrence of blocking.

TELEPHONE SWITCHING TRANSLATOR

Figure 1:
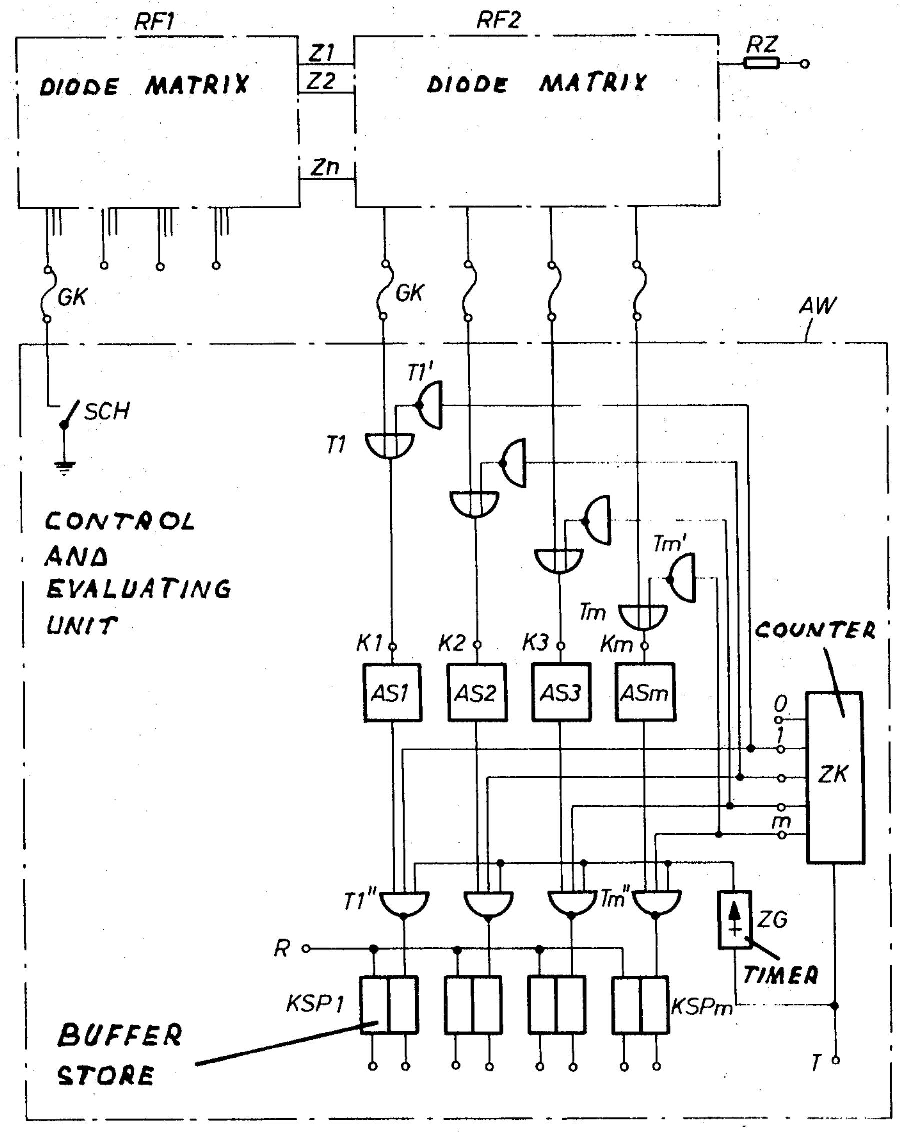

This invention relates to circuit arrangements for translators and more particularly to translators having a jumper field for input information or addresses, a jumper field for output information and a central controlling and evaluating unit. The invention is especially, although not exclusively, well adapted for use in telecommunication and data processing systems. In particular, the translator may be used for class-of-service translators in telephone exchange systems.

The input information received by such translators is usually fed in as a code to the central control unit. The information is passed to the jumper field arranged to receive input information in the form of a corresponding marking signal of a line-group. The marking signal, for a line-group in certain code, is converted in the jumper field to enable each different bit of input information to be associated with an individual piece of output information. The connected output is a marking signal for an individual row conductor.

The prior art includes a variety of different types of jumper fields. To aid in the comprehension of the following specification, it is assumed that a jumper field incorporating plug-in diodes is used.

In jumper field for output information, each individual row conductor is associated with a certain piece of output information. This association may be readily changed. The output information may signify a number presented in a certain code (as when a directory number is converted into a position number by a translator, for example). It may also signify a number of individual statements (as in class-of-service translators).

The controlling and evaluating unit is connected to the jumper fields via rack cables. The jumper fields and rack cables constitute a network also incorporating reactances. Where there is a large amount of output information, a considerable current must be fed into the system to be sure that all of the outlets are clearly marked. This involves difficulties when charging must occur via a row resistor having a relatively high resistance value.

An object of the invention is to provide a circuit arrangement for a translator in which such difficulties (large current requirements) do not occur.

The invention achieves this object, in that gate circuits are allocated to the evaluating circuits in the evaluating unit. Before evaluation, these gate circuits are provided with current via low-resistance secondary paths. The gate circuits are connected to the outputs of a counting chain adapted to individually block the low-resistance secondary paths of the gate circuits, in succession, for the purposes of evaluation. The advantage is that the marking of the outlets of the network is clear and unequivocal despite high-resistance row resistors. The interrogation of the translator outputs involves no significant new building up processes, since only one translator output loads the corresponding row resistor at a time. The invention is characterized in that further gate circuits are assigned to the evaluating circuits. The pulse responsible for indexing the counting chain is fed, via a time-lag component, to these gate circuits. This measure ensures that no invalid output information is indicated during the short period before the occurrence of blocking.

The invention is also characterized in that stores are assigned to the evaluating circuits. These stores convert, by buffer storage, the bits of output information successively received from the translator into a group of pieces of output information which may be read out simultaneously. With this measure, it is possible either to withdraw the total output information from all of the stores at the same time or to extract the individual pieces of information from the separate stores in succession.

Figure 2:
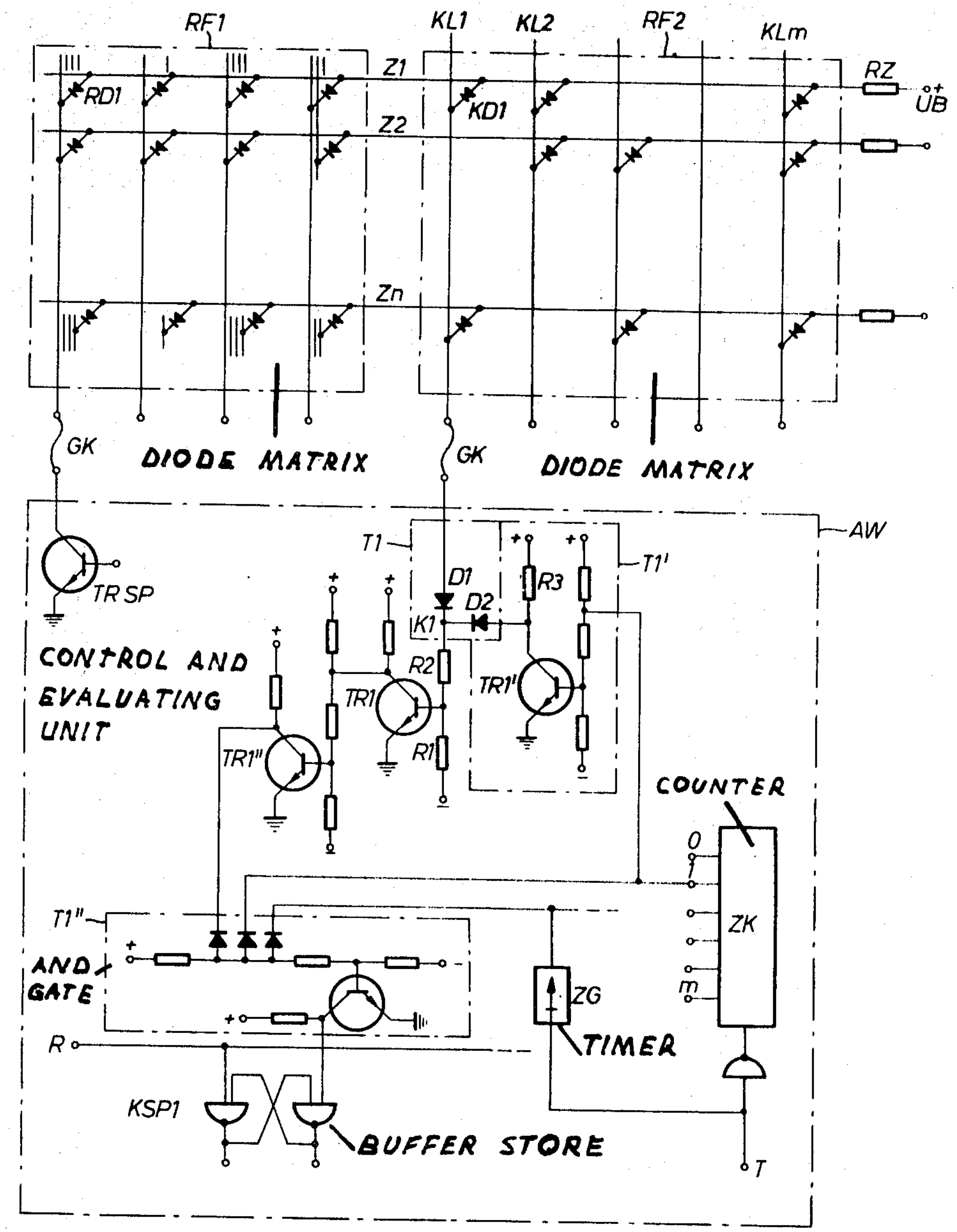

The above mentioned and other features and objects of this invention and the manner of obtaining them will become more apparent, and the invention itself will be best understood by reference to the following description of an embodiment of the invention taken in conjunction with the accompanying drawing, in which:

FIG. 1 is a block diagram showing a translator having the circuit arrangement of the invention; and FIG. 2 is a schematic diagram which shows details of the circuit units represented by blocks in FIG. 1.

The translator shown in FIG. 1 has three main parts. A diode matrix or jumper field RF1 receives input information. A diode matrix or jumper field RF2 provides output information. A controlling and evaluating unit AW reads and controls the jumper field. The evaluating unit AW is connected to the jumper fields RF1, RF2 via rack cables GK. The jumper fields RF1 and RF2 are interconnected via row conductors Z1 to Z*n*, each of which provides a separate piece of output information. To read out a particular row conductor, a certain piece of input information is passed through the controlling and evaluating unit AW to the inputs of the jumper field RF1. This is symbolically indicated in FIG. 1 by a switch SCH.

The inputs K1 to K*m* of the evaluating unit AW are preceded by gate circuits T1, T2...to T*m*. One input of each gate is connected to the corresponding output of the jumper field RF2 via the rack cable GK. The other input of each gate is connected to the corresponding output of a counting chain ZK via an inverter T1′ to T*m*′. The counting chain ZK is indexed by a pulse T so that each of the outputs 0, 1 to *m* is marked separately and in succession. In the counting position 0, the switches SCH are set to receive input information. In this position, all of the gate circuits T1 to T*m* are open, since none of the outputs 1 to *m* of the counting chain is marked. Thus, in each of the gate circuits T1 to T*m*, at least that input is marked which is connected to one of the gate circuits T1′ to T*m*′. In this loaded condition, the network comprising the jumper fields RF1, RF2 and the rack cables GK, having distributed line capacitances, builds up to the state corresponding to the adjusted input information and the selected assignment of "translation." However, no evaluation occurs as yet.

When the counting chain ZK is indexed to the counting position 1, the right-hand input of the gate circuit T1 is no longer marked. With the information present at the input of the jumper field RF1, it may be that the left-hand input of the gate circuit T1 is not marked either. In this case, the gate circuit T1 becomes conductive. The same applies to the gate circuits T2 to T*m*, as the counting chain is indexed to the other positions.

The inputs K1 to K*m* are connected in succession to evaluating circuits AS1 to AS*m*, which assume the states corresponding to the jumpering states, in the manner described above. The outputs of the evaluating circuits AS1 to AS*m* are each connected to one input of an associated gate circuit T1″ to T*m*″. The other inputs are connected to the corresponding output of the counting chain ZK and to the output of a common timer component ZG respectively.

The gate circuit T1″ provides no output signal when the output 1 of the counting chain ZK is marked, when the corresponding input K1 is marked, and when a certain period of time (measured by the timer at terminal ZG) has elapsed after the start of the pulse at terminal T.

Each of the outputs of the gate circuits T1″ to T*m*″ is connected to an input of one of the stores KSP1 to KSP*m*. The result of each interrogating the translator is fed into the store KSP1 –KSP*m*. The other inputs of the stores KSP1 to KSP*m* are connected to a reset input terminal R, by means of which all of the stores may be reset after their contents have been processed.

The physical principles of the operations discussed with reference to FIG. 1 will now be described with reference to the embodiment shown in FIG. 2.

Blocking transistors TRSP are provided in the evaluating unit AW to adjust the input information. If, for example, the input information is in decimal code, there are four times 10 transistors TRSP in order to make 10,000 different translation possibilities. In the quiescent state, all 40 transistors TRSP are normally conducting. All of the row conductors Z1 to Z*n* are grounded via the jumper diodes RD1 of the jumper field RF1 and the rack cable GK. In certain unfavorable cases, as when the field is not complete, all of the row conductors load a transistor TRSP in parallel. Thus, it is necessary to give the resistors RZ as high a resistance as possible.

To interrogate a translation, one of the 10 transistors TRSP is blocked in each of the four groups, in the example of a class-of-service translator. Those row conductors which are connected to a transistor which is conducting remain at earth potential. Only that row conductor which is connected to the four transistors TRSP that are blocked will attain a higher potential.

In the jumper field RF2, the row conductors Z1 to Z*n* are connected to class-of-service lines KL1 to KL*m* via class-of-service diodes KD1. These connections are made according to the desired class-of-service. All of the class-of-service lines which are not connected to the interrogated row conductor are at earth potential. A positive potential appears on the interrogated row conductor.

In the evaluating unit AW, only the circuit for the class of service K1 is shown in detail. All of the other class-of-service lines KL2 to KL*m* are connected to an identical circuit. When the counting chain ZK is in the counting position 0, the outputs 1 to *m* are at earth potential. The transistor TR1' is thus blocked, and positive potential is applied to its collector via the resistor R3. Thus, the gate circuits T1 to T*m* (FIG. 1) receive positive potential from both the rack cable GK and the gate circuits T1' to T*m*'—in the case of the jumpered class-of-service facilities of the interrogated translation. In the case of the nonjumpered class-of-service facilities, the corresponding gate circuits T1 to T*m* receive positive potential from only the corresponding gate circuits T1' to T*m*'. With these class-of-service facilities, the diode D1 prevents any undesirable charging of the rack cable which would slow down the evaluating process.

Also, in the counting position 0, the transistor TR1 and the other corresponding transistors are all conducting, since their bases receive positive potential at least via the resistor R3, the diode D2, and the resistor R2. Thus, the following transistor TR1'' provides a positive potential at its output leading to the gate circuit T1''. In the counting position 0, the gate circuit T1'' and all of the corresponding gate circuits T2'' to T*m*'' (FIG. 1), receive earth potential at second and third inputs. This ground comes from the corresponding output of the counting chain ZK and the timer ZG respectively. Thus, in this state of the circuit, all of the transistors in these gate circuits are blocked. A positive potential is sent to the appropriate circuit in the following store; for example, this may be a flip-flop in the class-of-service store KSP1, as illustrated.

In the present circuit arrangement, the resistors RZ can be given a relatively high resistance value. Even when a large number of class-of-service facilities are jumpered on a single row conductor, the transistors TR1 to TR*m* remain conducting with certainty. The "on" bias is supplied via the relatively low-resistance resistors R3, and all of the diodes D1 remain blocked.

When the pulses at the terminal T index the counting chain ZK one step further, its output 1 is marked with a positive potential. The transistor TR1' of the gate circuit T1' becomes conductive and ground potential appears at its collector. The transistor TR1 remains conductive only if the class-of-service diode KD1 is connected at the appropriate cross-point in the interrogated translation. In such a case, the diode D2 is blocked. The transistor TR1 remains conducting, and the collector of the transistor TR1'' retains a positive potential. At the same time the middle input of the gate circuit T1'' is marked with a positive potential. After a certain period of time, measured by the timer ZG, following the commencement of the pulse T, the timer marks the right-hand input of the gate circuit T1'' with positive potential. Thus, the AND condition for the gate circuit T1'' is fulfilled. Earth potential is passed to the store KSP1 from the collector of the transistor in the gate circuit T1''. However, if the class-of-service diode is jumpered at the cross point in the interrogated translator, negative potential passes to the base of the transistor TR1 and, consequently, positive potential appears at the collector. Thus, when the counting chain interrogates a nonjumpered class-of-service, ground potential passes to the left-hand input of the gate circuit T1''. Even when both the middle and the right-hand input of the gate circuit T1'' are marked with positive potential, a positive potential still appears at the collector of the transistor in the gate circuit T1''.

The same applies successively to the other class-of-service facilities. When the counting chain successively marks each of its outputs 2 to *m* with a positive potential, the entire store KSP1 to KSP*m* (FIG. 1) contains all of the class-of-service facilities of the interrogated input information. When the information thus obtained has been processed, the store is reset via the resetting input R.

With the circuit described above, the class-of-service facilities can be rapidly interrogated in succession after the rack cable is built up. The number of rows and the number of class-of-service facilities or the number of positions of the output information may be selected relatively high and the row resistors RZ may be selected relatively high and the row resistors RZ may have relatively high resistance values.

While the principles of the invention have been described above in connection with specific apparatus and applications, it is to be understood that this description is made only by way of example and not as a limitation on the scope of the invention.

I claim:

1. A translator having information data distribution means comprising a jumper field for input information, a jumper field for output information, and a central controlling and evaluating means, said central means comprising a counting chain, gate circuits allocated to individual evaluating circuits in the evaluating means, said gate circuits normally being provided with current via low-resistance secondary paths, means connecting the outputs of said gate circuits to the respective outputs of said counting chain, and means connecting the outputs of said counting chain to the inputs of said gate circuits for successively blocking the low-resistance secondary paths of the respective gate circuits individually on receipt of outputs from said counting chain for the purposes of evaluation.

2. The translator claimed in claim 1 and further gate circuits assigned to the respective evaluating circuits, and timer means for enabling or inhibiting said last-mentioned gate circuits a predetermined period of time after the receipt of outputs from said counting chain.

* * * * *